US012332144B2

(12) United States Patent
Jacob

(10) Patent No.: US 12,332,144 B2
(45) Date of Patent: Jun. 17, 2025

(54) CHECK VALVE TESTER

(71) Applicant: Billy Lawrence Jacob, Abilene, TX (US)

(72) Inventor: Billy Lawrence Jacob, Abilene, TX (US)

(73) Assignee: Billy Lawrence Jacob, Abilene, TX (US)

( * ) Notice: Subject to any disclaimer, the term of this patent is extended or adjusted under 35 U.S.C. 154(b) by 0 days.

(21) Appl. No.: 18/445,788

(22) Filed: Feb. 2, 2024

(65) Prior Publication Data
US 2025/0060272 A1 Feb. 20, 2025

Related U.S. Application Data

(60) Provisional application No. 63/628,717, filed on Aug. 16, 2023.

(51) Int. Cl.
G01M 3/28 (2006.01)
(52) U.S. Cl.
CPC .................. G01M 3/2876 (2013.01)
(58) Field of Classification Search
CPC .................................. G01M 3/2876
See application file for complete search history.

(56) References Cited

U.S. PATENT DOCUMENTS 5,566,704 A * 10/1996 Ackroyd ............. E03C 1/106
137/557
5,713,240 A * 2/1998 Engelmann ........ F16K 15/035
73/168

(Continued)

OTHER PUBLICATIONS

"Site Tube Options for DCVA Testing" by Arbiterbackflow screenshots downloaded from Youtube. https://www.youtube.com/watch?v=d0TpIRLGgOk (Year: 2023).*

(Continued)

Primary Examiner — Natalie Huls
(74) Attorney, Agent, or Firm — Whitaker Chalk Swindle & Schwartz PLLC; Charles D. Gunter, Jr.

(57) ABSTRACT

The present invention comprises a very simple apparatus for low pressure testing of equipment used in the water industry such a backflow preventing assemblies, and in particular double check valve backflow assemblies used in the landscape irrigation industry. Testing method is simple. Connect the swivel nut located at the bottom of apparatus to the test cock of a check valve on the normal upstream side of check valve to be tested, manipulate the insolation valves and test cocks of the backflow preventing assembly using conventional procedures and fill the site glass of the apparatus to the level identified on the sight glass with a black line indicating "1.5 psi—Start Test" line. Open test cocks of the check valve test so that pressure is applied to upstream side of the check valve and test cock on the downstream of the check is open to atmospheric pressure. Observe water level in the apparatus sight glass and if water level remains above the red line located on the sight glass indicating "1.0 psi-Fail Line" the check valve passes the test and is performing satisfactorily. Similarly, if water level in sight glass falls below the red indicating line, the check valve fails. The invention is a very simples Pass/Fail test that is accurate, quick, economical, and easy for the licensed tester to perform. It can also be used by plumbers, landscape irrigators and water consumers having an irrigation system for a quick test of their own backflow preventing assembly.

8 Claims, 1 Drawing Sheet

ELEVATION

(56) References Cited

U.S. PATENT DOCUMENTS

| | | | | |
|---|---|---|---|---|
| 9,476,805 B2* | 10/2016 | Doran | ........................ | F17D 5/00 |
| 2019/0086289 A1* | 3/2019 | Shaw, Jr. | ................ | E03C 1/106 |
| 2020/0370677 A1* | 11/2020 | Mendez | .................. | G01L 15/00 |

OTHER PUBLICATIONS

Amazon page for "Sight Tube and Bleed Off Valve Kit" from Bac-Flo Unlimited, Inc.*

Instructions for Backflow Test Site Tube downloaded from samsonriser.com.*

* cited by examiner

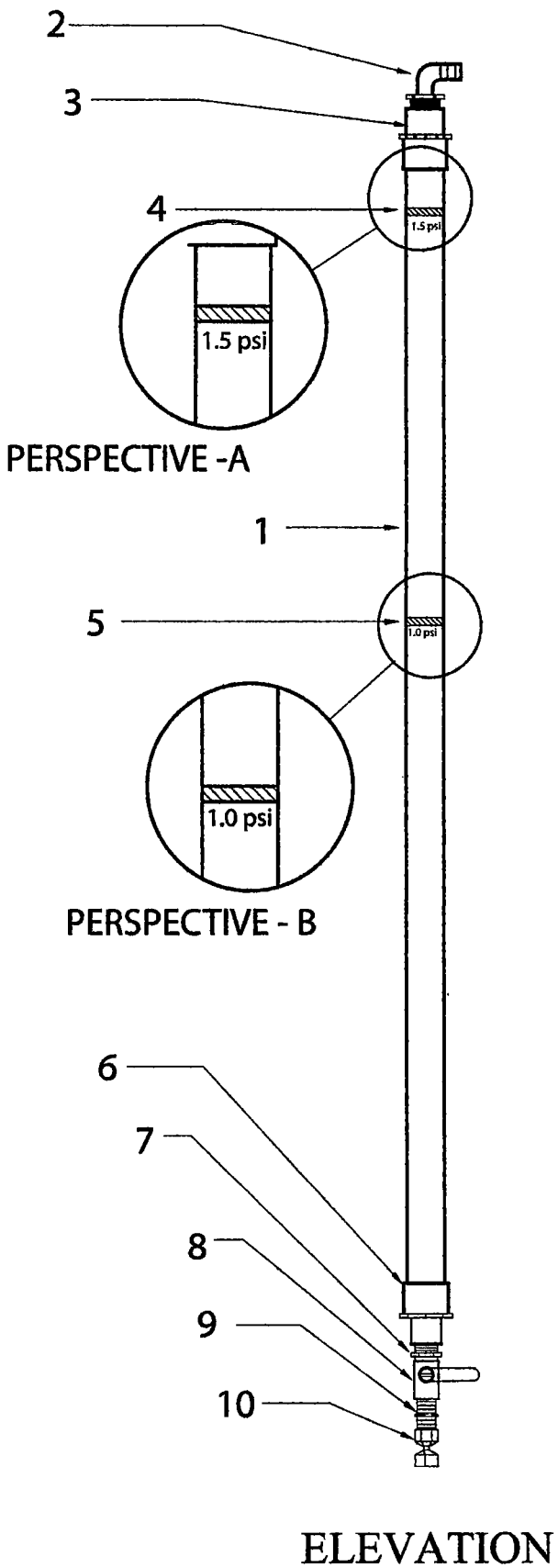
ELEVATION

CHECK VALVE TESTER

CROSS-REFERENCE TO RELATED APPLICATIONS

This nonprovisional application claims the benefits of a Provisional Application, U.S. Application No. 63/628,717, Filing Date of Aug. 16, 2023, Name of First Inventor of Billy Lawrence Jacob, Title of Invention of 2.31 Check valve tester, and Confirmation No. 8440.

STATEMENT REGARDING FEDERALLY SPONSORED RESEARCH OR DEVELOPMENT

Not Applicable

REFERENCE TO A SEQUENCE LISTING, A LARGE TABLE, OR A COMPUTER PROGRAM LISTING APPENDIX ON READ-ONLY OPTICAL DISC

Not Applicable

BACKGROUND OF THE INVENTION

Field of the Invention

This invention relates to production of a very simple novel apparatus that can be used as an alternative to a pressure gauge, that can test the proper functioning of check valves that are part of a backflow preventing assembly used for commercial and residential purposes in the landscape irrigation industry. More particularly, the invention applies the minimum pressure, in feet of water head, to check valves, incorporated in a double check valve (DCV), pressure vacuum breaker, (PVB), and spill-resistant pressure vacuum breaker (SVB), backflow preventing assemblies used to protect public and private water distribution systems from cross-connections, backpressure or back siphonage. The object of the test is to determine if the check valve can sustain the minimum test pressure of 1.0 psi, which is the equivalent of 2.31 feet of water head, adopted in landscape irrigation rules in many of the U.S. States. The apparatus provides the tester performing the test with a visual observation of the level of the water head applied to the check valve in a sight glass. The sight glass comprises a clear PVC pipe marked with a start of test line located at 1.5 psi above a test cock and a fail test line located at 1.0 psi above a test cock. If the water level falls below, the fail line, it is a failed test. The invention is applicable to U.S. patent classification definitions Class 73, Measuring and Testing—Section I.

Billy Jacob, Author of this invention is a licensed professional engineer in the State of Texas with a status of inactive, since his retirement from an active consulting engineering firm. Author was involved in the development of water and wastewater resources for municipalities, water supply corporations, water supply districts, private development, federal and state agencies for 45 years. Author of this invention was in direct charge of many water resource projects that included specifications for various types and sizes of water and wastewater pipe, water meters, pipe fittings, meter boxes, pressure regulating valves, backflow prevention valves, hydropneumatic pressure tanks, pumping stations, elevated and ground storage tanks, and all kinds of materials and appurtenances comprising a water system meeting State of Texas design rules and regulations for an approved water system. Author is well informed in the Laws of Fluid Properties and Hydrostatics through education (BS in Civil Engineering) and experience of 45 years in design, construction, administration, and maintenance of water resource systems.

The State of Texas, under Title 30, TAC, Chapter 344 has established rules applicable to landscape irrigation. The rules set forth the standards of conduct for irrigators, irrigation technicians, backflow prevention testers, irrigation technicians, irrigation inspectors, and local requirements. Provisions in the rules for local regulations, require all municipalities providing a public water system with a population of 20,000 or greater, to adopt as a minimum, the landscape irrigation rules established in Chapter 344. Purveyors of a public water system below the 20,000 population, as a minimum, should address regulations regarding backflow preventing and testing of backflow preventing assemblies. Municipalities falling under the 20,000-population rule, shall also verify that the irrigator that designs and installs an irrigation system holds a valid irrigator's license and has obtained a permit before installing a system within its territorial limits or its extraterritorial jurisdiction. The rules of Chapter 344 are enforced by The Texas Commission on Environmental Quality (TCEQ).

Subchapter E, Chapter 344.50 of the rules set fourth backflow preventing and cross-connection considerations for a public water system. The type of backflow preventing assembly to be used is based on the hazard (health hazard or non-health hazard) and hydraulic conditions. If there are no conditions that present a health hazard, double check valve backflow prevention assemblies may be used to prevent backflow if the assembly is tested, test cocks are normally plugged and used for testing only. The Texas rules define the backflow preventing assemble as a mechanical assembly used to prevent backflow into a potable water system. Double check valve preventing assemblies installed below ground shall have a clearance all the way around the assembly to allow space for testing and repair. The rules, Chapter 344.50 (e), further states—At a minimum, all backflow preventing assemblies shall be tested by a licensed backflow prevention assembly tester upon installation, repair, replacement, or relocation. Those double check valve backflow preventing assemblies used in irrigation systems designated as health hazard, shall be tested annually. On non-health hazard declaration, the DCV backflow preventing assembly shall be tested every three years and any time maintenance is performed on the supply line of the irrigation system. The results of the backflow preventing assembly test are to be provided to the local water purveyor within ten business days of testing. The TCEQ has established a Reporting Form, for submittal of the test results, with instructions that the results should be completed on-site, while testing is occurring. Currently, many residential, and general commercial consumer landscape irrigation systems are determined to be non-health hazard. Therefore, the DCV backflow preventing assembly is a common method for satisfying the landscape irrigation rules.

The Landscape Rules, further define the DCV backflow preventing assembly as a mechanical assembly that is composed of two internally spring loaded, independently operating, check valves, including tightly closing resilient seated shutoff valves attached at each end of the assembly and fitted with properly located resilient seated test cocks. Current manufacturing configuration of the double check valve assembly is made up of a single cast bronze/brass body that contains the two check valves, and valve seats, and contains three test cocks arranged to have a test cock on the upstream and downstream side of each check valve. The resilient seated shutoff valves as defined in the rules, is manufactured with one resilient seated ball shutoff valve attached with a brass nipple to the upstream end of the cast bronze check valve body and one resilient seated ball shutoff valve located downstream of the cast bronze check valve and connected by brass nipple, and comprising the total assembly. The upstream ball valve body is configured with a test cock located upstream of the ball of the valve. Thus, there are four test cocks involved with testing of DCV backflow prevention assemble. The test cock open/close ball valve is generally a ¼" ball valve with one-360 degree turn screw driver operator and has ⅛", ¼" or ⅜" male or female flare inlet and outlet. Each check valve of the assembly is designed by the manufacture to sustain a minimum of 1.0 psi (2.31 feet of water head) applied against the backside of the check with the upstream side of the check at atmospheric pressure (test cock open).

The DCV backflow preventing assembly used in a landscape irrigation is installed downstream of the water purveyor's customer meter and is the beginning of the landscape irrigation system. It is usually located underground and enclosed in a standard type rigid meter box. Depth of the assembly varies from a depth of 10 to 16 inches below the top of the box. Based on water pressure available from the purveyor's system and the number of sprinkler heads per irrigation station, the size of a DCV backflow preventing assembly is usually a one inch or one-and-a-half-inch assembly.

The above referenced rules, commissioned by the State of Texas, and by most all U.S. States, establish the fact that there are a lot of backflow preventing assemblies out there and a lot of tests to be made by a licensed tester to assure compliance.

The methods being used today to test the various type of backflow preventing assemblies is by use of a pressure gauge, calibrated with a pressure range of 0 to 100 psi or more, assembled with three to five color coded hoses, of which two or four, are attached to the test cocks of the backflow preventing assembly. Each of the outlets of the pressure gauge has a variable finger screw type valve to release are increase flow of water pressure from the gauge to the test port. This method of testing has many drawbacks that hinder the accuracy of the test. The hoses for making the connection from the gauge to the test cocks makes the contraption awkward to attach to the test cocks, located under ground level, in a rigid type meter box. The tester must take time to make sure each color hose from the gauge is connected to the proper test cock and must open and close all the pressure valves from the backflow assembly to the gauge in proper sequence to display the pressure sustained by the check valve that is being tested. It is dubious to believe that the reading of 1.0 psi minimum to 2 psi (sometimes used by the tester to report a passing test) is accurate. If that is not confusing enough, the State irrigation rules suggests that the test results be entered on their reporting form as the assembly is being testing. The pressure gauge assemble with all the hose connections is expense and to meet the state and local performance rules must be calibrated for accuracy on a regular schedule. All these disadvantages of the pressure gauge work together to increase the difficulty of performing a very simple pass or fail test of a backing flow preventing assembly required to be tested at only 1.0 psi or 2.31 feet of water head.

Therefore, a need exists in the field for testing of backflow preventing assemblies, and in particular, the double check valve backflow preventing assemble and the like.

BRIEF SUMMARY OF THE INVENTION

The present invention comprises a very simple apparatus for low pressure testing of equipment used in the water industry such a backflow preventing assemblies used in landscape irrigation. The test apparatus, comprises a sight glass made of a of clear, blue tented, 1" PVC pipe column, or the like, and is comprised with PVC and bronze fittings arranged on top and bottom ends of the sight glass column when looking at the pipe held in a vertical position. The apparatus as assembled, allows venting of the pipe column at the top, when filling with water to the necessary test levels. The bottom portion of the apparatus is comprised of PVC and brass fittings and bushings, a ball shut off valve with lever operator, and a two-piece brass swivel adapter with flare fitting arranged for easily connecting the test column to the test cock of a backflow preventing assembly or the like. The invention can be used for many other low pressure test situations and can test the accuracy of a pressure gauge up to 1.5 psi or 3.44 feet of water head. The invention can also be used for troubleshooting leaking check valves of double check valve backflow preventing assemblies up to a differential pressure equal to the static pressure of the water purveyor's system.

Overall length of the testing apparatus is 3.83 feet (46.0 inches), with a weight of about 23 ounces, making it easy for maneuvering in the field and transporting to perform the test. Current minimum test pressure requirement for double check valve backflow preventing assemblies and the like, is 1.0 psi or 2.31 feet of head. Length of the apparatus provides adequate length to test up to 1.7 psi or 3.927 feet of water head, although this level is not in view in the clear area of the sight glass and is not marked as a test level. Test pressure of 1.7 psi is at the elbow overflow level.

The theory of the invention and test apparatus is based on the laws of Fluid Properties and Hydrostatics. One fundamental law of hydraulics in dealing with atmospheric pressure is expressed in the equation: p=wh. In this equation it should be remembered that, in substituting numerical values, care must be taken to see that the units used are consistent. The specific weight of water (w), is generally accepted as 62.4 pounds per cubic foot. If weight is expressed in pounds per cubic foot, then the pressure head (h) must be measured in feet and pressure (p) will result in pounds per square foot. It is common practice to express hydraulic pressures in pounds per square inch (psi) in which case, the resulting equation is:

$$P = \frac{62.4 \times h}{144}(\text{feet}) = \frac{(\text{feet})}{2.31} \text{ lb. per } sq. \text{ in} (psi)$$

That is, to find the pressure in pounds per square inch corresponding to any head in feet, divide the head by 2.31. This is a very convenient rule of hydraulics, which points out the fact that 2.31 feet of water causes a pressure of 1 pound per square inch. This is also the basic principle for the design of pressure gauges that convert the static water head to a calibrated pressure on a dial gauge.

BRIEF DESCRIPTION OF THE DRAWINGS

The embodiments of the present invention are illustrated as an example and are not limited by the figures of the accompanying drawings, in which like references may indicate similar elements an in which:

The Elevation view shown in the drawings show the simplicity and the extents of the apparatus and embodies the parts that make up a complete working assembly. The apparatus is cemeterial about the centerline, therefore the parts that comprise the apparatus can be shown in the one Elevation view. The test apparatus, in general, is a site glass pipe column comprised of clear PVC with fittings at the top to vent the column and fittings at the bottom to transition to a pipe size necessary to connect to the test cock of a backflow preventing assembly or the like. Each part comprising the apparatus is shown and identified with dimensions as necessary on the Elevation view. Perspective views are included to show a blow up of the test makings on the sight glass pipe column. The upper water level, which is visible in the site glass pipe column, is the start of a test, is identified by a ¼" wide black marking, black O-ring, or the like around the circumference of the pipe column also includes the wording "1.5 psi—TEST LINE" located directly below the black mark. The lower water level, which is visible in the site glass pipe column, the Fail Line, is identified by a ¼" wide red marking, red O-ring, or the like around the circumference of the pipe column and includes the wording "1.0 psi—FAIL LINE" located directly below the red mark. The O-ring markings can be held securely in place by milling a notch around the circumference of the sight glass having a width of one-eighth to one-fourth of an inch and depth of 50 thousandths.

DETAILED DESCRIPTION OF THE INVENTION

The present invention comprises a very simple apparatus for the low pressure testing necessary to test the proper functioning of check valve(s) that are part of a backflow preventing assembly used in landscape irrigation. This invention is directed to meeting the test requirements as discussed in the Background to the Invention, Paragraph 0008 to 0012. The minimum sustained test pressure currently established for a passing test of a check valve(s) of a backflow preventing assembly under landscape irrigation rules in Texas, as well as in many States, is 1.0 psi or 2.31 feet of water head. Isolation valves and test cocks must be included in an approved backflow preventing assemble.

This invention will provide an accurate, economical, easy way to test if a check valve(s) of a backflow preventing assembly will hold a sustained pressure of 1.0 psi or 2.31 feet of water head by visually observing the water head in a sight glass.

The terminology used herein is for the purpose of describing embodiments only and is not intended to be limiting of the invention. As used herein, the term "and/or" includes all combinations of one or more of the associated listed items. It will be further understood that the terms "comprises" and/or "comprising," when used in this specification, specify the presence of stated features, steps, operations, elements, and/or components, but do not preclude the presence of addition of one or more other features, steps, operations elements, components and/or groups thereof.

Unless otherwise defined, all terms, including technical and scientific terms, used herein have the same meaning as commonly understood by one having ordinary knowledge in the art to which this invention belongs, including engineering, plumbing and the landscape irrigation industry. It will be further understood that terms, such as those defined in commonly used dictionaries, should be interpreted as having a meaning that is consistent with their meaning in content of the relevant art and the present disclosure and will not be interpreted in an idealized or overly formal sense unless expressly so defined herein. PVC Schedule 40 pipe used for the sight glass and PVC fittings shown on the drawings and identified herein will meet requirements of ASTM D1785 and ASTM D2466. The clear, blue-tinted site glass is also rated as shatter-proof. Brass fittings shown on the drawings and identified herein will meet requirements of ASTM 584 with lead free copper alloy. PVC pipe and fittings are available through local plumbing and waterworks wholesale suppliers, hardware stores, and home and farm centers throughout the United States.

In describing the invention, it will be understood that a few techniques, and steps are disclosed. Each of these has individual benefit and each can also be used in conjunction with one or more, ore in some cases all, of the other disclose techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated in the drawings or description herein.

The present invention will now be described by referencing the appended Elevation view shown in the drawings. The apparatus is cemeterial about the centerline, therefore the parts that comprise the apparatus can be shown in the one Elevation view.

The 2.31 Check Valve Tester, the apparatus, is a sight glass column comprised of a Schedule 40 PVC clear pipe 1 with fittings at the top to vent the column and fittings at the bottom to transition to a pipe size necessary to connect to the test cock of a backflow preventing assembly or the like. When connected to the back flow preventing assembly, the sight glass column is positioned vertically. Each part of the apparatus is shown and identified with dimensions as necessary on the Elevation view shown in the drawings. Perspective views are included to show a blow up of the test makings on the sight glass pipe column. When performing a test, the upper water level, which is visible on the sight glass pipe column, is the Start Test line, and is identified by a ¼" wide black marking, black O-ring 4, or the like around the circumference of the pipe column also includes the wording "1.5 psi—TEST LINE" located directly below the black mark. The lower water level, which is visible on the sight glass pipe column, is the Fail Line, is identified by a ¼" wide red marking, red O-ring 5, or the like around the circumference of the pipe column also includes the wording "1.0 psi—FAIL LINE" located directly below the red mark. The red 1.0 psi—FAIL LINE 5, is positioned at 2.31 feet (27.75 inches) above the two-piece swivel brass fitting 10, also the bottom end of the apparatus, as shown on the drawings Elevation view. The red indicator mark/line is the water level in the sight glass pipe column at the 1.0 psi Fail Test point for the check valve being tested. The black 1.5 psi—TEST LINE 4 is positioned at 1.125 feet (13.50 inches) above the red indication mark 5 on the sight glass pipe column, also being 3.44 feet (41.25 inches) above the two-piece swivel brass fitting 10, also the bottom end of the apparatus. The black indicator mark 4 or like is water level of the 1.5 psi start of test; however, the test can begin at overflow level at the barb fitting 2, if tester does not want to bleed water from the pipe column to start the check valve test or at any water level above the 1.0 psi—FAIL LINE.

Pipe fittings comprising the apparatus, beginning at the top of the sight glass pipe main body, and working down are: Glued to the top of the sight glass pipe column 1, is a 1"×¾" PVC transition fitting 3, slip by inside thread. A ¾" thread× ½" barb nylon or like elbow fitting 2 is screwed into the 1"×¾" transition fitting 3. The elbow fitting 2 vents the pipe column when filling and testing the check valve. The elbow is also useful for directing the water vented from the pipe column away from the tester if the pipe column is over filled. These two fittings 2 and 3, comprise the top portion of the testing apparatus. Glued to the bottom of sight glass pipe column 1 is a 1"×¾" PVC transition fitting 6, slip by inside thread, followed by a ¾" PVC×¼" PVC bushing 7, MIP× FIP inside, followed by ¼"×¼" brass ball valve with lever operator 8, MPT×FPT, followed by a ¼"×¼" brass adapter 9, MPT×M flare or the like, followed by a ¼"×¼" two-piece brass swivel adapter 10, F flare×F flare. The four fittings, 6,7,9, and 10 and ball valve 8 comprise the lower parts of the apparatus and transition from 1" size to ¼" size or like for attaching the apparatus to the test cock of a backflow preventing assemble, a pressure gauge or other types of backflow preventing assemblies or equipment having test cocks for low pressure testing of 0 to 1.5 psi.

The brass ball valve with lever operator 8, is an accessory to the apparatus that many testers might find useful. The ball valve will normally be in the open position for filling the sight glass with water. After a tester performs a test procedure and the test is a passed test, water will remain in the sight glass. Instead of removing the test apparatus from the test cock immediately, the ball valve 8 can be closed, before removing the apparatus from the test port. The apparatus then can be connected to another test port, if necessary, thereby, reusing the water in the sight glass or the water can be drained outside of the of the valve box housing the assembly being tested.

Overall length of the Apparatus, comprising the 1" sight glass pipe column land fittings arranged as show on the Elevation view of the drawings, is 3.83 feet (46 inches) and weight of the assembly is about 23 ounces. The length, being under four-feet, makes it is easy to maneuver and easy to carry to the field for testing.

Performing the test of a DCV backflow preventing assembly is easy. When used in a landscape irrigation system, most backflow preventing assemblies are installed in the ground in a valve box with test cocks looking up. There are certain sequences that a tester is accustom to using when opening and closing of the backflow preventing assembly isolation valves and test cocks. This apparatus uses the same basic sequences, except that the apparatus is connected to only one test cock at a time instead of connecting four hoses to different test cocks when using a pressure gauge. For example, the procedure for testing the check valve of a DCV backflow preventing assemble with this invention would be, 1. Close the downstream isolation valve of assembly being tested. 2. Attach the swivel adapter 10 of the test apparatus to the downstream side test cock of check valve being tested. 3. Open test cock that test apparatus is connected to, observing that lever operated ball valve 8 is open and fill the sight glass to the water level of the Black 1.5 psi—Test Line 4. 4. Close the lever operated ball valve 8 of the apparatus. 5. Close upstream isolation valve of assembly being tested. 6. Open test cock located upstream of check valve being tested to atmospheric pressure. 7. Open lever operated ball valve 8 of the apparatus. 8. Observe if water level in site glass remains above the Red—Fail Line 5. It would not be unusual if water level in site glass drops some, but if check valve is leaking and level drops below the Red—Fail Line 5 it is a failing test. 8. Close all test cocks. 9. Close lever operated ball valve 8. 10. Loosen swivel adapter 10, and remove it out of the housing box of the backflow assembly. 13. Drain the water remaining in the sight glass pipe outside of the housing box by opening ball valve 8 14. Connect the test apparatus to another check valve for testing following steps, 1 thru 13, if necessary to complete a test or 15. Return isolation valves of the assembly being tested to the open position if there is a passing test. 16. If there is a failed test leave the isolation valves in a closed position and notify owner. 17. Complete results of test report and go to the house.

The procedure for the testing of a backflow preventing assembly using this invention appears quite compilated, but it is being performed by a licensed tester or landscape irrigator with, his or her, knees on the ground and close to the assembly to complete the test in expedient manner. If the tester has found that the isolation valves of the assembly tested are operable, the test itself should take about twenty minutes or less. A good plumber, landscape irrigator or tester could find a quick work around an un-operable shut off valve of the assembly he is testing, by using a shut-off valve that should have been installed upstream of the backflow preventing assembly or using the water meter shut-off valve to isolate the backflow assembly from the system pressure to complete a test.

What is claimed:

1. A method for testing the performance of backflow-preventing assemblies used in landscape irrigation systems which uses a sight glass assembly which is designed to attach to only one testcock of the backflow-preventing assembly at a time during testing, the method comprising the steps of:

providing a bottom fitting for attachment to a testcock of the backflow-preventing assembly being tested;

providing a ball valve being connected in-line with the bottom fitting and at a position above the bottom fitting, the ball valve being in fluid communication with the bottom fitting and through the bottom fitting to the testcock, the ball valve being operable between an open position to open and fill the sight glass with water from the backflow prevention assembly and a closed position which retains water within the sight glass the ball valve being again movable to the open position to apply a static pressure head to the testcock during testing;

providing a sight glass located above the ball valve and in fluid communication with the ball valve and through the ball valve and bottom fitting to the testcock, the sight glass having a first marking indicia at a given level on the sight glass which indicates a start pressure level of 1.5 psi and a second marking indicia at a given level on the sight glass which indicates a fail pressure level of 1.0 psi;

a pipe elbow vent attached at an upper end of the sight glass for venting contents of the sight glass;

wherein, upon attachment of the sight glass assembly to a testcock, the apparatus is configured to allow a tester to proceed with standard testing procedures as defined by the State of Texas under Title 30, TAC, Chapter 344 et seq. by:

a. filling the sight glass with water to the start pressure level at 1.5 psi either directly from an available water system or by pre-charging from the landscape irrigation system being tested, including the following methods;

1. with the ball valved closed and the sight glass attached to a testcock, filling the sight glass by removing the upper pipe elbow vent and hand filling the sight glass with water from an available source to the 1.5 start test level, then replacing the vent elbow;

2. with the ball valve closed but without having attached the sight glass to a testcock, removing the upper pipe elbow vent and hand filling the sight glass with water from an available source to the 1.5 start test level, then replacing the vent elbow, followed by attaching the sight glass assembly to the testcock;

b. applying the pressure head to the testcock; and c. visually observing whether the water level remains static or falls below the fail-level marking at 1.0 psi.

2. The method of claim 1, wherein the sight glass assembly is portable and does not include any additional connecting components, meters or electronic components.

3. The method of claim 1, wherein the method is designed to test check valves within backflow-preventing assemblies, including double check valves, pressure vacuum breakers and spill resistant vacuum breakers, under low-pressure conditions of less than about 1.5 psi, equivalent to 2.31 feet of static water head.

4. The method of claim 1, wherein the static water head is applied to an upstream testcock of the check valve being tested with the downstream open to atmospheric pressure.

5. The method of claim 1, wherein the sight glass is formed of a clear material which allows visual observation of the contents of the sight glass.

6. The method of claim 1, wherein the sight assembly has a red marking, affixed to the sight glass to indicate a pressure fail-line at 1.0 psi and a black marking, affixed to the sight glass to indicate a pressure start test-line at 1.5 psi.

7. The method of claim 1, wherein the sight glass assembly is further provided with:

a swivel fitting for attachment to the testcock of the backflow-preventing assembly;

a first adapter between the swivel fitting and the ball valve;

a second adapter and pipe reducer located between the ball valve and a bottom end of the sight glass;

a second pipe reducer located at a top end of the sight glass; and a pipe elbow vent located above the second pipe reducer.

8. The method of claim 1, wherein a machined notch is cut around the circumference of the sight glass at the 1.0 psi and at 1.5 psi water levels and wherein a red O-ring and black O-ring are fitted into the two notches, respectively, to mark the fail-line and start test-line for the testing.

\* \* \* \* \*